United States Patent
Gonzales et al.

(10) Patent No.: US 9,748,549 B2
(45) Date of Patent: Aug. 29, 2017

(54) INTEGRATED CELL SEPARATOR/HIGH VOLTAGE BUS BAR CARRIER ASSEMBLY

(71) Applicant: FORD GLOBAL TECHNOLOGIES, LLC, Dearborn, MI (US)

(72) Inventors: Philip Michael Gonzales, Dearborn, MI (US); Enrique Rivera, Taylor, MI (US); Mary Casci, Beavercreek, OH (US)

(73) Assignee: Ford Global Technologies, LLC, Dearborn, MI (US)

( * ) Notice: Subject to any disclaimer, the term of this patent is extended or adjusted under 35 U.S.C. 154(b) by 481 days.

(21) Appl. No.: 14/132,270

(22) Filed: Dec. 18, 2013

(65) Prior Publication Data
US 2015/0171402 A1  Jun. 18, 2015

(51) Int. Cl.
| | |
|---|---|
| *H01M 2/10* | (2006.01) |
| *H01M 4/00* | (2006.01) |
| *H01M 2/20* | (2006.01) |
| *H01M 10/48* | (2006.01) |
| *H01M 10/6555* | (2014.01) |

(52) U.S. Cl.
CPC ......... *H01M 2/206* (2013.01); *H01M 2/1077* (2013.01); *H01M 10/482* (2013.01); *H01M 10/486* (2013.01); *H01M 10/6555* (2015.04); *H01M 2220/20* (2013.01)

(58) Field of Classification Search
CPC ............. H01M 2/206; H01M 10/6555; H01M 2/1077; H01M 10/482
See application file for complete search history.

(56) References Cited

U.S. PATENT DOCUMENTS

| | | |
|---|---|---|
| 7,740,981 B2 | 6/2010 | Hashida et al. |
| 2008/0280198 A1 | 11/2008 | Kumar et al. |

FOREIGN PATENT DOCUMENTS

JP  5223607 B2  6/2013

*Primary Examiner* — Helen O Conley
(74) *Attorney, Agent, or Firm* — David Kelley, Esq.; Tung & Associates

(57) ABSTRACT

An integrated cell separator/high voltage bus bar carrier assembly for a high voltage traction battery includes a cell separator having a plurality of cell separator walls and a plurality of bus bar retention walls carried by the plurality of cell separator walls. A high voltage bus bar is carried by the plurality of bus bar retention walls of the cell separator.

17 Claims, 1 Drawing Sheet

INTEGRATED CELL SEPARATOR/HIGH VOLTAGE BUS BAR CARRIER ASSEMBLY

FIELD

Illustrative embodiments of the disclosure generally relate to high voltage traction battery systems for electrified vehicles (EVs). More particularly, illustrative embodiments of the disclosure relate to an integrated cell or ultra-capacitors separator and high voltage bus bar carrier assembly having an integrated cell separator, HV bus bar and sensing terminals.

BACKGROUND

High voltage traction battery systems for electrified vehicles may utilize two independent parts: a cell separator plate which maintains isolation and facilitates air flow between adjacent battery cells and an HV harness which holds the HV bus bars, HV sensing wiring and temperature sensors. With two independent components, however, tooling costs for each part as well as the required assembly line time required to install each component into the array is increased.

Accordingly, an integrated cell separator and high voltage bus bar carrier assembly having an integrated cell separator, HV bus bar and sensing terminals may be desirable.

SUMMARY

Illustrative embodiments of the disclosure are generally directed to an integrated cell separator/high voltage bus bar carrier assembly for a high voltage traction battery. An illustrative embodiment of the assembly includes a cell separator having a plurality of cell separator walls and a plurality of bus bar retention walls carried by the plurality of cell separator walls. A high voltage bus bar is carried by the plurality of bus bar retention walls of the cell separator.

BRIEF DESCRIPTION OF THE DRAWINGS

Illustrative embodiments of the disclosure will now be described, by way of example, with reference to the accompanying drawings, in which.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable users skilled in the art to practice the disclosure and are not intended to limit the scope of the claims. Moreover, the illustrative embodiments described herein are not exhaustive and embodiments or implementations other than those which are described herein and which fall within the scope of the appended claims are possible. Furthermore, there is no intention to be bound by any expressed or implied theory presented in the preceding technical field, background, brief summary or the following detailed description.

Figure 1:
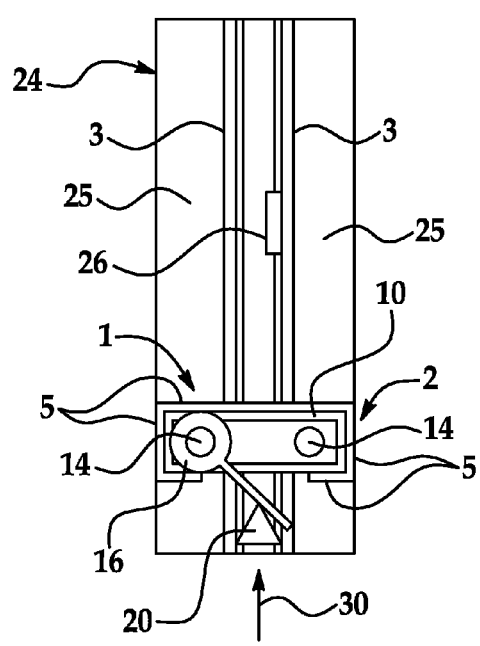
FIG. 1 is a top view of an illustrative embodiment of the integrated cell separator/high voltage bus bar carrier assembly mounted on a pair of adjacent battery cells of an HV traction battery.
Figure 2:
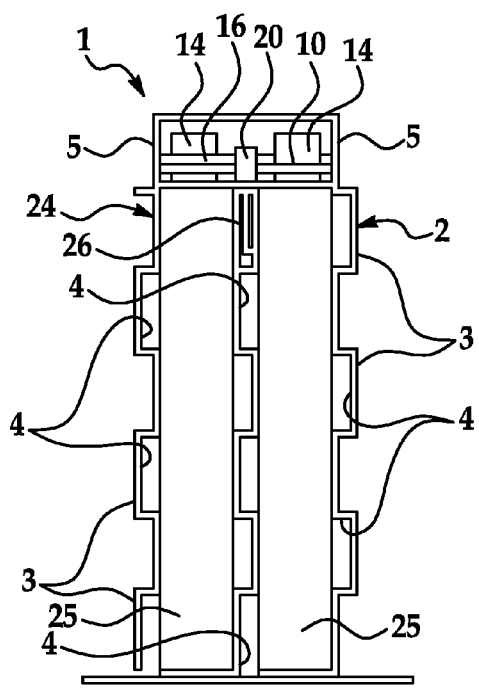
FIG. 2 is a side view of the illustrative integrated cell separator/high voltage bus bar carrier assembly illustrated in FIG. 1.
Figure 3:
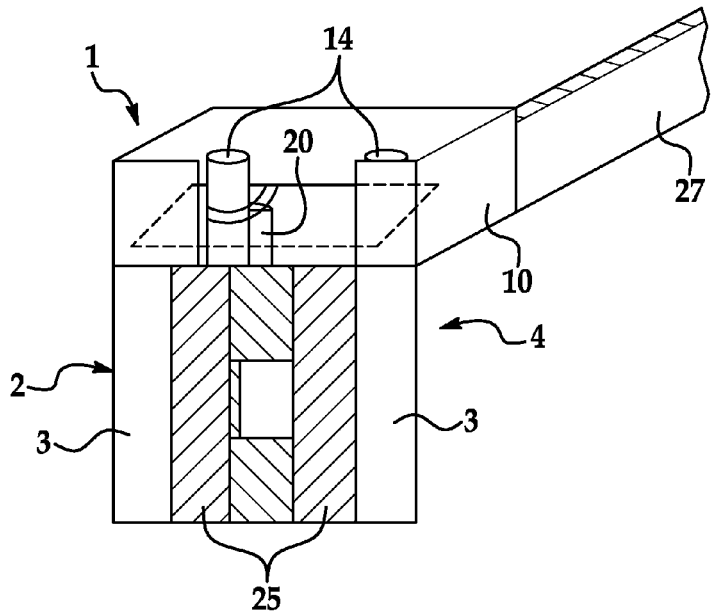
FIG. 3 is a perspective view of an illustrative embodiment of the integrated cell separator/high voltage bus bar carrier assembly mounted on a pair of adjacent battery cells of an HV traction battery.

Referring to the drawings, an illustrative embodiment of the integrated cell separator/high voltage bus bar carrier assembly, hereinafter assembly, is generally indicated by reference numeral 1. In FIGS. 1-3, the assembly 1 is mounted on a pair of adjacent battery cells 25 in an HV traction battery 24. The HV traction battery 24 may be suitable for providing electric power to an electrified vehicle such as a hybrid electric vehicle (HEV), for example and without limitation, in the conventional manner.

The assembly 1 includes a cell separator 2. The cell separator 2 may be plastic, for example and without limitation, and may include multiple cell separator walls 3. The cell separator walls 3 of the cell separator 2 may be adapted to extend over and between the battery cells 25 of the HV traction battery 24. Multiple air flow channels 4 may be formed or shaped in each of the cell separator walls 3. The air flow channels 4 may extend between and along the interior and exterior surfaces of the battery cells 25 to direct air in thermal contact with the interior and exterior surfaces of the battery calls 25 as air 30 (FIG. 1) flows through the air flow channels 4. At least one temperature sensor opening 26 may extend through at least one of the cell separator walls 3. The temperature sensor opening 26 may be sized and configured to accommodate a cell temperature sensor (not shown).

Bus bar retention walls 5 may extend upwardly from the cell separator walls 3 of the cell separator 2. An HV bus bar 10 may be retained within the bus bar retention walls 5 on top of the battery cells 25. A pair of HV (High Voltage) sensing terminals 14 may be supported by the HV bus bar 10. The HV sensing terminals 14 may be placed in electrical contact with the respective battery cells 25 upon placement of the assembly 1 on the HV traction battery 24. A sensing eyelet 16 may be provided on one of the HV sensing terminals 14. An anti-rotation mechanism 20 may be supported by the cell separator walls 3 generally adjacent to the HV bus bar 10. The anti-rotation mechanism 20 may engage the sensing eyelet 16 to prevent inadvertent rotation of the sensing eyelet 16 on the HV sensing terminal 14.

In exemplary application, the assembly 1 is installed on the HV traction battery 24 by inserting the cell separator 2 over and between the battery cells 25. The HV sensing terminals 14 on the HV bus bar 10 are placed into electrical contact with the respective battery cells 25. The sensing eyelet 16 is placed on the HV sensing terminal 14 and may be rotated to engage the anti-rotation mechanism 20, which prevents further rotation of the sensing eyelet 16 on the HV sensing terminal 14. Air 30 (FIG. 1) may flow through the air flow channels 4 between and on the exterior surfaces of the battery cells 25 to remove heat from the HV traction battery 24.

Although the embodiments of this disclosure have been described with respect to certain exemplary embodiments, it is to be understood that the specific embodiments are for purposes of illustration and not limitation, as other variations will occur to those of skill in the art.

What is claimed is:

1. An integrated traction battery assembly, comprising:
a cell separator including:
a plurality of cell separator walls configured to extend over and disposed in-between battery cells comprising the traction battery; and
the plurality of cell separator walls comprising a plurality of bus bar retention walls, the plurality of bus bar retention walls comprising at least one wall configured to extend over and spaced above at least one voltage terminal and associated voltage bus bar on the battery cells; and
the voltage bus bar retained within the plurality of bus bar retention walls of the cell separator.

2. The assembly of claim 1 further comprising a plurality of channels configured for air flow in the plurality of cell separator walls.

3. The assembly of claim 1 further comprising at least one temperature sensor opening in the plurality of cell separator walls.

4. The assembly of claim 1 further comprising the at least one voltage terminal carried by the voltage bus bar.

5. The assembly of claim 4 wherein the at least one voltage terminal comprises a pair of voltage terminals.

6. An integrated cell separator/high voltage bus bar carrier assembly for a high voltage traction battery, comprising:
a cell separator including:
a plurality of cell separator walls configured to extend over and disposed in-between battery cells comprising the traction battery; and
the plurality of cell separator walls comprising a plurality of bus bar retention walls, the plurality of bus bar retention walls comprising at least one wall configured to extend over and spaced above from at least one voltage terminal and associated voltage bus bar on the battery cells;
the voltage bus bar retained within the plurality of bus bar retention walls;
the at least one voltage terminal carried by the voltage bus bar;
at least one eyelet carried by the at least one voltage terminal; and
an anti-rotation mechanism carried by the plurality of cell separator walls and engaging the at least one eyelet.

7. The assembly of claim 6 further comprising a plurality of channels configured for air flow in the plurality of cell separator walls.

8. The assembly of claim 6 further comprising at least one temperature sensor opening in the plurality of cell separator walls.

9. The assembly of claim 6 wherein the at least one voltage terminal comprises a pair of voltage terminals.

10. An integrated cell separator/high voltage bus bar carrier assembly configured to attach to a high voltage traction battery having a pair of voltage terminals, comprising:
a cell separator including:
a plurality of cell separator walls configured to extend over and disposed in-between battery cells comprising the traction battery; and
the plurality of cell separator walls comprising a plurality of bus bar retention walls, the plurality of bus bar retention walls comprising a wall configured to extend over and spaced above the pair of voltage terminals and associated voltage bus bar on the battery cells;
the voltage bus bar retained within the plurality of bus bar retention walls;
the pair of voltage terminals carried by the voltage bus bar and configured to be placed in electrical contact with the pair of battery cells, respectively, of the high voltage traction battery;
a eyelet carried by at least one of the voltage terminals; and
an anti-rotation mechanism carried by the plurality of cell separator walls and engaging the eyelet.

11. The assembly of claim 10 further comprising a plurality of channels configured for air flow in the plurality of cell separator walls, the plurality of channels configured to be placed in thermal contact with interior and exterior surfaces of the pair of battery cells, respectively.

12. The assembly of claim 10 further comprising at least one temperature sensor opening in the plurality of cell separator walls.

13. The assembly of claim 10 where the eyelet is configured to be rotated to engage the anti-rotation mechanism.

14. The assembly of claim 6 where the eyelet is configured to be rotated to engage the anti-rotation mechanism.

15. The assembly of claim 4 further comprising at least one eyelet carried by the at least one voltage terminal.

16. The assembly of claim 15 further comprising an anti-rotation mechanism carried by the plurality of cell separator walls and engaging the at least one eyelet.

17. The assembly of claim 16 where the eyelet is configured to be rotated to engage the anti-rotation mechanism.

* * * * *